United States Patent Office 3,079,209
Patented Feb. 26, 1963

3,079,209
DYEING NATURAL STONES AND SHELLS
WITH OIL SOLUBLE DYES
James D. Boggus, Jasper, Ga., assignor to Marble Products
Company of Georgia, a corporation of Georgia
No Drawing. Filed May 24, 1960, Ser. No. 31,281
24 Claims. (Cl. 8—8)

This invention broadly relates to the coloring of porous inorganic materials and, in one of its more specific aspects, to the coloring of naturally occurring stone and aquatic animal shells in particulate, slab or block form and the artificially colored product thus produced.

Naturally occurring, vividly colored stone suitable for decorative purposes and which also possesses sufficiently high strength for use as a building material is in great demand. However, such stone is not readily available in most localities and the cost is prohibitively high in most instances for other than limited uses where the added expense is not an important factor. Additionally, the limited number of colors and hues of commercially available stone imposes somewhat of a restriction on decorative possibilities. As a result, there has been much unsuccessful experimentation prior to the present invention in an effort to prepare an economical artificially colored stone having desirable properties similar to those of naturally occurring colored stone such as a vivid, intense color extending into the interior of the stone, high strength characteristic of the natural stone before coloring and, preferably, good resistance to fading upon exposure to ultra violet light, oxygen and oxidizing agents, moisture and other elements of weathering.

In general, with the exception of materials such as glassy quartz which do not have a microcrystalline structure, commonly occurring stones are characterized by the presence of numerous interconnecting microscopic intercrystalline spacings or voids, which may be referred to in the specification and claims as pores, and these result in a surprisingly porous structure. The pores are permeable to air and water and these substances are present to varying extent.

The processes for coloring naturally occurring stone described in the prior art invariably involve a pretreatment for the purpose of removing the water or moisture content of the stone prior to the coloring step, such as by heating to a high temperature or evacuating to a low pressure in a vacuum chamber. Since the water is held tenaciously, the pretreatment necessarily involves vigorous conditions of treatment. The treated stone then is contacted with a solution of dye or coloring agent in a solvent to produce the artificially colored stone. In every instance the resultant product was unsatisfactory due in part to the low levels of color intensity obtainable and the deterioration of the stone in the pretreatment step such as by weakening its crystalline structure and lowering the mechanical properties. Additionally, the prior art processes did not result in satisfactory penetration and retention of the coloring agent throughout the stone and the pretreatment was of such a nature as to be uneconomical and to require a large amount of heat or expensive special equipment. In view of the above, the art has long sought an entirely satisfactory method for the coloring of naturally occurring stone so as to resemble the usually more expensive, less readily available naturally colored stones.

The present invention may be described and illustrated hereinafter with specific reference to the coloring of dolomitic limestone, whitestone, dolomite, calcitic limestone, marble, granite, or aquatic animal shells in the form of chips such as are satisfactory in the manufacture of terrazzo and composition blocks or for use as roofing granules. The colored chips for the manufacture of terrazzo or composition blocks, whether they be of dolomitic limestone, marble, granite, or other porous inorganic material, must possess a combination of properties in order to meet all aesthetic and mechanical strength requirements. For example, since such materials are commonly used in terrazzo floors, it is essential that the product be hard and possess great mechanical strength. Additionally, it is desirable that the chips be intensely colored so that they may be used alone or admixed with a contrasting color or colors to provide a pleasing effect in place as roofing granules or when set in terrazzo topping. Also, the colored chips should be resistant to fading and they must be capable of being placed in the terrazzo topping without discoloring the matrix by bleeding. Furthermore, for terrazzo, it is essential that the color be uniform, or almost so, throughout the chip. The artificially colored stone available heretofore has not possessed all of the foregoing characteristics and the industry has been forced to resort to the usually more expensive naturally colored chips which may cost several times as much as the more plentiful white marble, dolomite, dolomitic limestone, granite, aquatic animal shells, or other naturally porous stones.

In accordance with an important embodiment of the present invention, porous inorganic material may be intensely and substantially uniformly colored without the necessity for a pretreatment step for the removal of water. When the porous inorganic material is in the form of chips satisfactory for the preparation of terrazzo, or for roofing granules, or in larger sizes, they may be intensely and uniformly colored to provide chips that are entirely satisfactory for the manufacture of terrazzo, marble chip roofs, and for other purposes. The resultant chips will not bleed into the matrix in the manufacture of terrazzo by conventional practices. Also, the original strength and mechanical properties of the stone are not adversely affected and it is as satisfactory in all respects as the natural untreated stone. Other embodiments of the present invention provide a process for the removal of solvent used in coloring the stone, a process for the removal of excess dye or coloring agent from the colored stone which normally would result in bleeding if not removed, and a process for increasing the colorfastness of the colored product.

It is an object of the present invention to provide a novel process for coloring porous inorganic materials which does not require a pretreatment step for the removal of water.

It is a further object of the present invention to provide a novel process for removing organic solvent used in the coloring step from the resultant colored inorganic material.

It is still a further object of the present invention to provide a novel process for removing excess dye or coloring agent from the exterior of the resultant colored product.

It is still a further object of the present invention to provide a novel process for coloring porous inorganic material whereby the stability to ultra violet light of the resultant color in the product is increased.

It is still a further object of the present invention to provide a novel process for coloring porous naturally occurring stone and aquatic animal shells in block, slab or particulate form by means of a solution consisting essentially of an oil soluble colorant dissolved in a normally liquid organic solvent whereby the slabs, blocks or particles of stone or shells may be colored in their natural state without the necessity for a heating step.

It is still a further object of the present invention to provide a novel artificially colored product prepared in accordance with the invention.

It is still a further object of the present invention to provide terrazzo containing the novel artificially colored product prepared in accordance with the invention.

It is still a further object of the present invention to provide novel artificially colored stone chips useful in the construction of stone chip roofs of many colors and hues which retain the desirable qualities of the untreated chips and a stone chip roof containing the same.

Still other objects and the attendant advantages of the present invention will be apparent to those skilled in the art upon reference to the following detailed description and the examples.

In accordance with one embodiment of the present invention, a porous body of inorganic material is colored by contacting the same with a solution consisting essentially of an organic, oil-soluble, water insoluble colorant such as an organic dye or other organic coloring agent dissolved in a normally liquid organic solvent. The resultant colored porous body may be subjected to further treatment as will be described hereinafter for the removal of solvent and its contained colorant content and the removal of excess colorant from the exterior surfaces. additionally, the invention provides a process whereby the colorfastness of the colored product may be improved.

A wide variety of colorants is satisfactory in practicing the invention. Examples include azo dyestuffs and dyes derived from anthraquinone, triphenylmethane, acridine, quinoline and diphenylmethane. Still other colorants are satisfactory as will be recognized by those skilled in the art in view of the above. The above dyes are commercially available and are listed in numerous reference texts such as the Colour Index published jointly by the American Association of Textile Chemists and Colourists and The Society of Dyers and Colourists (Great Britain), this publication being incorporated herein by reference. Some dyes or coloring agents are more satisfactory than others and thus are preferred. For instance, a dye known as C.I. Solvent Red 26 marketed by several dyestuffs manufacturers including the Ciba Company, Inc. is a preferred dye. C.I. Solvent Red 26 is said to have the following structure:

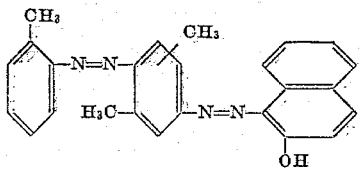

In many instances, better results are obtained with relatively large azo dyestuff molecules containing a minimum number of water-solubilizing groups such as —OH, —SO$_3$H, and —COOH. Experimental results indicate that the presence of carbonyl groups on the dye molecule tends generally to produce less satisfactory results. In addition, those dyestuffs which are classified in the Colour Index as basic dyes, e.g., C. I. Basic Yellow 2, are poorer coloring agents than the so-called acid dyes. In general, dyestuffs soluble in water or dilute alkali are not satisfactory unless some additional process is employed to prevent bleeding or leaching of the colorant upon exposure to water or dilute alkali.

The colorants preferred for practicing the present invention are characterized by additional properties, as follows:

A. The colorant should be soluble in a solvent which is capable of penetrating the stone under normal ambient conditions in a reasonable period of time such as not more than 24 hours.

B. The colorant should be retained in the pores of the porous body without being removed by the solvent during the solvent removal step.

C. The colorant should be stable to moisture and preferably alkaline aqueous solutions.

D. The colorant should be resistant to oxidation or weathering, stable to light and especially ultra violet light, and stable at normal temperatures encountered.

For some reason which is not fully understood at the present time, many dye or coloring agent solutions fail to penetrate properly and to a depth great enough in a practical period of time to result in substantially uniform coloring of a high intensity throughout the body to be colored. The selection of a solvent is of importance in obtaining good penetration, and in some instances the combination of a given solvent and a specific dye or coloring agent provides a synergistic combination which results in both good penetration and retention of the dye or coloring agent. Water-soluble dyes and water soluble inorganic colored materials applied from an aqueous bath in general have not been found to be satisfactory without prolonged exposure to the colorant followed by a fixative treatment due to their limited penetration and, in most cases, a tendency to bleed color when later subjected to water. Those coloring agents which can be made to react with the stone suffer less from the latter disadvantage.

As mentioned above, the selection of a suitable solvent is of importance. Some normally liquid organic solvents are more satisfactory than others and, as a general rule, water insoluble nonpolar solvents or substantially water insoluble nonpolar solvents having a dielectric constant less than 10 are preferred. In some instances, liquid organic solvents having a dielectric constant higher than 10 are satisfactory, but usually these solvents exhibit a high degree of solvency for the dye or coloring agent employed. Examples of suitable solvents include liquid aliphatic hydrocarbons, preferably those having at least six carbon atoms, such as kerosene, heptane and octane; liquid cyclo hydrocarbons such as cyclohexane, liquid aromatic hydrocarbons such as benzene, liquid chlorinated hydrocarbons such as carbon tetrachloride, chloroethene, and chloroform, and benzene derivatives such as nitrobenzene. Mixtures of suitable solvents may be used, if desired. Examples of solvents found to be generally unsatisfactory include water, water containing a synthetic detergent, ethanol, iso-amylol, and Cellosolve (ethylene glycol monoethyl ether).

The specific solvent to be selected should be capable of dissolving at least 1 to 40 grams of colorant per gallon of the solvent. Where the colorant is intensely colored and strongly retained by the stone, then lower concentrations such as ¼ to 1 gram per gallon may be satisfactory. In instances where a colorant is very soluble in the solvent, then higher concentrations than 40 grams per gallon such as up to the limit of solubility of the colorant in the solvent may be useful.

In practicing a preferred embodiment of the invention, stone of a desired size and without a pretreatment to remove water, e.g., as quarried, is contacted with a solution of a colorant over a period of time which is sufficient to result in penetration to a desired depth and in coloration to a desired intensity. This will vary somewhat with each type of stone and colorant. Usually, a period of treatment of 24 hours or less is satisfactory, with periods of treatment between 4 hours and 24 hours being preferred in most instances. The period of treatment may be shortened somewhat by warming the solution of colorant, or the chips themselves, such as by warming to a temperature limited by the boiling point of the solvent. However, this is not necessary and is economically undesirable. Heating to a high enough temperature to remove all water from the stone should be avoided to prevent deterioration of the stone.

The resultant colored stone is taken from the solution of colorant and the residual solvent removed. This may be accomplished by draining the solvent from the stone and then allowing the remaining solvent to evaporate. However, preferably, whenever a water-insoluble solvent is being used, the solvent together with its colorant content is recovered by flooding the stone with water whereby a layer of water-insoluble solvent and colorant separates as a second phase and is withdrawn. This will result in removal of substantially all of the solvent and excess colorant but small quantities remain on the exterior surfaces which render the stone unsatisfactory for use in terrazzo manufacture due to a tendency of such surface colorant to bleed. These remaining traces of solvent and colorant on the exterior may be removed by washing, with vigorous agitation, the stone in water containing a small amount of a commercial surface active agent. The resultant stone is satisfactory for terrazzo manufacture or for use as roofing granules. The stone may be given an alternative treatment, if desired, for the removal of the excess colorant and solvent when agitation is not used in the above washing step. This may be accomplished, when the stone contains carbonate, by washing with a dilute solution of an acid stronger than carbonic acid and capable of liberating carbon dioxide such as at least 0.05 normal sulfuric acid. Mineral and organic acids in general may be used for this purpose. It is not necessary to agitate the stone physically since the reaction of acid with the carbonate results in liberation of carbon dioxide gas on the surface of the stone and this cleans the stone to a degree which is entirely satisfactory. After treating the stone as above described, the stone may be washed with fresh water and it is ready for use.

Another alternative method of cleaning the colored product involves employment of ultrasonic shock waves and this method may be termed sonic cleaning herein. Sonic cleaning is well known as it is extensively used in cleaning laboratory glassware and numerous other articles, and apparatus therefor is commercially available. Sonic cleaning of the stone is rapid, efficient, a detergent is not required, and the stone may be merely immersed in water, and it results in non-degenerative removal of both solvent and excess exterior colorant.

The stability or colorfastness of a given organic colorant may be improved by means of a commercially available material which is known to absorb ultra violet radiation. The ultra violet stabilizer may be dissolved in the dye or coloring solution, if desired, and it also may be used as a component of the sealer composition ordinarily applied to terrazzo. Examples of such commercially available materials are well known to the art, and are extensively employed by the textile and plastics industries for the purpose of improving the colorfastness properties of their respective products. The general requirements or specifications for a preferred stabilizer to be used in this process include:

(1) The solubility in the solvents employed in the process in an amount to impart the desired degree of colorfastness.

(2) Insolubility, or at least very poor solubility, in water.

(3) The stabilizer should be capable of withstanding the normal conditions to which the end product of the invention is exposed.

(4) The stabilizer should be colorless, or nearly so, so as to not impair the integrity of the color imparted by the process of the invention.

(5) Most important, the stabilizer should be capable of reducing incident, degenerative radiation to a level tolerable by the dye or coloring agent employed in the process.

A commercially available product manufactured by the Geigy Chemical Corporation under the name of Tinuvin-P has been found to essentially satisfy the above requirements. Tinuvin-P is said to be alkylated 2-hydroxyphenyl benzotriazole. The concentration of the ultra violet absorbent may be very low in the solution of colorant such as about 0.25% by weight, but larger amounts may be used if necessary or desired. In general, the ultra violet stabilizer should be present in the colorant solution in an amount of 0.05 to 10 weight percent for best results.

A water-washing step may follow any of the preceding steps. A final rinse in fresh water is desirable to remove surface active agent, if used, which otherwise may tend to promote bleeding when the stone is later employed in the manufacture of terrazzo.

In practicing the present invention, stone of a desired size and shape may be colored in the as-quarried state and without the necessity for a pretreatment step in preparation for the dyeing or coloring step. When the stone is in the form of terrazzo chips or roofing granules, the artificially colored stone of the present invention may be substituted for the heretofore used naturally colored stone chips without other alteration in a conventional terrazzo manufacturing or roof construction process. If desired, additional colorfastness may be imparted to the terrazzo tile by including an ultra violet absorbent in the sealer coating which is normally applied to the finished surface.

Stones dyed or colored in accordance with the present invention may have a very pleasing appearance, intense, bright coloration and the colorant may penetrate to the center of the stone without a substantial gradation in intensity of color. For example, stones ⅛ inch to ½ inch and up to one inch in diameter or slabs up to one inch in thickness may be dyed with the center portion having substantially the same intensity of color as the surface portion. Often, even larger stones may be colored throughout if desired, such as up to eight inches in diameter. Blocks or slabs of marble or other porous stone may be dyed or colored to a substantial depth such as up to eight inches or greater. Many uses for the artificially colored chips, slabs or block products of the invention which are not encompassed by the terrazzo or roofing industries may be proposed. For example, a decorative composition block having artificially colored chips as one component and a cementing agent as a second component may be manufactured by conventional methods. Additionally, artificially colored chips which are fast to the leaching action of water may be used as aquarium chips and monuments, structural elements and the like may be given a decorative hue by the process of the invention. Many other uses will be apparent to those skilled in the art in view of the above.

The following specific examples further illustrate the present invention:

EXAMPLE I

A kerosene solution was prepared containing 10 grams per gallon of an oil-soluble dye marketed as Oil Red B and referred to as Solvent Red 26 in the Colour Index, Second Edition. When preparing the solution, the dye was dissolved in a small amount of benzene and poured into the kerosene solvent. The resultant kerosene solution of dye was then charged to a reactor.

White dolomitic limestone chips of a size suitable for the manufacture of terrazzo or stone chip roofs (No. 2 terrazzo chips) in the as-quarried, crushed and sized condition and without pretreatment to remove water or air from the pores were charged to the reactor containing the dye solution. The chips were immersed in the dye solution at ambient temperature and the solution was circulated through the chips over a period of sixteen hours. The resultant chips had a vivid, intense red color which extended throughout the interior without a substantial gradation in intensity. The color was set and the chips did not bleed in water.

The dye solution was drained from the reactor and passed to a storage tank awaiting reuse as an analysis indicated that only a very small amount of dye was required to provide the desired intensity of coloration in the chips. It was estimated that less than one ounce of dye was required per ton of chips.

The reactor was flooded with fresh water. Most of the residual kerosene solution of dye retained by the chips appeared as a second phase floating on top of the water and was recovered. Then, 1% by weight of a commercially available surface active agent (Synthrapol GP) was added to the water and the water circulated through the colored chips without agitation for the purpose of removing the remaining solvent. The colored chips were free of residual kerosene after treatment with the detergent but when used in the manufacture of terrazzo, the color bled from individual chips into the surrounding topping. It was discovered that this highly undesirable bleeding could be prevented by washing the chips with vigorous agitation. This resulted in excess dye being removed from the surface and no bleeding was noticeable upon use of the resultant chips in terrazzo manufacture when following conventional practice.

It was found that excess dye could be removed from the surface of the chips by immersion in a 0.1 normal sulfuric acid solution, a 5% vinegar (acetic acid) solution, or other solution of mineral or organic acid of a strength which will liberated carbon dioxide. After rinsing with fresh water to remove the spent acid solution and precipitated calcium and magnesium sulfate, the chips were satisfactory for the manufacture of terrazzo tile or other purposes. Excess dye also may be removed by immersing the colored chips in water and subjecting the same to sonic cleaning by means of ultrasonic energy.

Artificially colored chips as above prepared and treated to remove excess dye were used in the manufacture of terrazzo following conventional practice. They were found to be very satisfactory and especially from the standpoint of mechanical strength and uniform intensity of color. The color was a pleasing, vivid, brilliant red and was found to be of substantially the same intensity throughout the particles of stone. Thus, the artificially colored stone of the invention is as satisfactory as naturally occurring colored stone for terrazzo. When used in the manufacture of marble chip roofs following conventional practice, the artificially colored stone prepared as above was likewise found to be as satisfactory as the naturally occurring colored stone.

While the above prepared artificially colored stone was entirely satisfactory, it was found that the colorfastness of the colorant could be improved by adding an ultra violet stabilizer to the kerosene solution of dye. While many suitable ultra violet stabilizers known to the plastics and textile arts are satisfactory, a 0.25% by weight solution of Tinuvin-P, which is said to be alkylated 2-hydroxyphenyl benzotriazole, was found to be very satisfactory. Upon testing samples of stone colored in the presence of Tinuvin-P, it was found that the colorant exhibited at least a 50% greater resistance to fading. It was further found that sealing the surface of terrazzo with a sealer containing Tinuvin-P in an amount such as 1–10% by weight resulted in further resistance to fading.

EXAMPLE II

This example illustrates the coloring of other types of porous inorganic naturally occurring stone chips by the process of Example I, with the exception that the kerosene solution contained 40 grams per gallon of the dye and the chips were immersed for a period of 20 hours. The following results were obtained:

A. *Grey Indiana Limestone*

The above stone was extremely porous and colored very easily, with the dye penetrating readily and exhibiting good retention.

B. *Supreme White, a Calcareous White Marble From Gomez Palacio, D.G.O., Mexico*

The above is very white and somewhat less porous than the dolomitic limestone of Example I. The processed chips exhibited a bright, good color, and the retention of the penetrated color was very good.

C. *Granite From Marietta, Georgia*

The above stone shows more than 50% black with a white fill. The chips colored readily, with the white fill attaining an intense, bright red color. The black portion was substantially unchanged in appearance. The naturally colored black portion and artificially colored red portion resulted in very beautiful terrazzo when used for this purpose.

D. *Granite From Stone Mountain, Georgia*

This granite is considerably whiter than the Marietta, Georgia, granite, referred to above. The color penetration and retention was very good and the product had a vivid, intense red color which extended throughout the chips.

E. *Crushed Oyster Shells*

Crushed oyster shells were found to be readily colored with the exception of the non-porous portions of the shell known as Mother of Pearl. When the colored shells were used in the manufacture of terrazzo, the panels were very beautiful.

F. *Marble From Tate, Georgia*

The color penetration and retention was substantially the same as for the dolomitic limestone of Example I.

G. *Smoky Quartz*

This material is non-porous and the color did not penetrate to any significant extent.

The artificially colored chips prepared in the above paragraphs A–F were tested and the color was found to be colorfast. The color extended throughout the chips. Also, the color was set and could not be leached out with water. The resultant chips could be used in the manufacture of terrazzo, roofs, concrete composition blocks, etc., and were as satisfactory as naturally colored stone.

EXAMPLE III

The procedure of Example I was repeated for a number of different dyes. The color was of a satisfactory intensity in each instance. The results obtained are recorded below in Table I.

TABLE I

| Colorant | | | Type Chemical | Penetration |
|---|---|---|---|---|
| Name | Part I, Colour Index | Part II, Colour Index | | |
| Ciba Oil, Orange GC | Solv. Yell. 14 +Solv. Red 26 | 12,055 26,120 | Monoazo (Mixture). | Good. |
| Ciba Oil, Bronze | Solv. Yell. 14 +Solv. Red 26 | 12,055 26,120 | do | Do. |
| Ciba Oil, Red B | Solv. Red 26 | 26,120 | diazo | Excellent. |
| Allied Oil, Orange 2B | Solv. Yell. 14 | 12,055 | | Good |
| Allied Oil, Red O | Solv. Red 27 | 26,125 | Xylazoxylidine 2 Naphthol. | Fair. |
| Allied Oil, Yellow 3G | Solv. Yell. 29 | 21,230 | | Excellent. |
| Allied Oil, Brown Y | Solv. Ora. 31 | | | Fair. |
| Allied Oil, Brown M | Solv. Brn. 21 | | | Do. |
| Patent Red BX | | | Methyl Azobenzene. | Good. |
| Patent Red AB4 | | | Azo | Do. |
| Patent Purple DRS | | | do | Fair. |
| Patent Blue 1003 | | | Aminoanthraquinone. | Good. |
| Patent Ero Blue | | | do | Excellent. |

EXAMPLE IV

It has been found that the specific solvent selected greatly influences the penetration-retention characteristics of the colorant. This example illustrates the effect of a series of solvents on the intensity of color in the resultant artificially colored chips when following the procedure of Example I, with the exception of using a commercially available dye known as Patent Red BX, which is said to be a methyl derivative of azo benzene, in a concentration of 32 grams per gallon and with the chips being immersed in the solvent solution of the dye for a period of 24 hours in each instance. The colored chips were inspected and arranged in order of intensity of color. The results obtained are recorded below in Table II with the solvents being arranged in order of increasing intensity of color in the resultant chips:

TABLE II

| Solvent | Color Ranking | Intensity of Color |
|---|---|---|
| $H_2O$ | 0 | Unsatisfactory. |
| $H_2O$+5% GP° | 1 | Do. |
| Ethanol | 2 | Do. |
| Iso-Amylol | 3 | Do. |
| Cellosolve [1] | 4 | Do. |
| Ethyl Acetate | 5 | Do. |
| Petroleum Ether (75° C.) | 6 | Do. |
| Dioxane | 7 | Do. |
| Gasoline | 8 | Do. |
| Acetone | 9 | Do. |
| Heptanes (mixture) | 10 | Satisfactory. |
| Dimethylformamide | 11 | Do. |
| Kerosene | 12 | Do. |
| Aniline | 13 | Do. |
| Cyclohexane | 14 | Do. |
| Carbon Tetrachloride | 15 | Do. |
| Chlorothene [2] | 16 | Do. |
| Chloroform | 17 | Do. |
| Benzene | 18 | Do. |
| Turpentine | 19 | Do. |
| Nitrobenzene | 20 | Do. |

°GP=nonionic detergent.
[1] Cellosolve=ethyl ether or ethylene glycol.
[2] Chlorothene=1,1,1 trichloroethylene.

EXAMPLE V

The procedure of Example IV was repeated with the exception of substituting a commercially available dye known as Patent Ero Blue and using a concentration of dye of 30 grams per gallon with the chips being immersed in the dye solution for a period of 20 hours in each instance. The results obtained are recorded below in Table III with the solvents being arranged in order of increasing intensity of color in the resultant chips.

TABLE III

| Solvent | Color Ranking | Intensity of Color |
|---|---|---|
| $H_2O$ | 0 | Unsatisfactory. |
| $H_2O$+5% GP | 1 | Do. |
| Iso-Amylol | 2 | Do. |
| Ethanol | 3 | Do. |
| Cellosolve | 4 | Do. |
| Dioxane | 5 | Do. |
| Turpentine | 6 | Satisfactory. |
| Petroleum Ether | 7 | Do. |
| Cyclohexane | 8 | Do. |
| Kerosene | 9 | Do. |
| Heptanes (mixture) | 10 | Do. |
| Gasoline | 11 | Do. |
| Dimenthylformamide | 12 | Do. |
| Ethyl Acetate | 13 | Do. |
| Chlorothene | 14 | Do. |
| $CCl_4$ | 15 | Do. |
| $CHCl_3$ | 16 | Do. |
| Acetone | 17 | Do. |
| Benzene | 18 | Do. |
| Nitrobenzene | 19 | Do. |
| Aniline | 20 | Do. |

What is claimed is:

1. A process for artificially coloring in its interior a body of a colorable naturally occurring material selected from the group consisting of whitestone, calcitic limestone, dolomitic limestone, dolomite, marble, granite, and aquatic animal shells which consists essentially of the step of intimately contacting said material with a solution consisting essentially of an organic, water insoluble, oil soluble colorant selected from the group consisting of azo dyestuffs, anthraquinone dyestuffs, triphenylmethane dyestuffs, acridine dyestuffs, quinoline dyestuffs, diphenylmethane dyestuffs and azoxy dyestuffs dissolved in a normally liquid organic solvent consisting essentially of at least one solvent, selected from the group consisting of normally liquid hydrocarbons, normally liquid chlorinated hydrocarbons, nitrobenzene, ethyl acetate, acetone, aniline and dimethylformamide, an excess of the solution of colorant over the quantity required to coat the surface area being intimately contacted with the body of material over at least 15 minutes and for a period of time sufficient for the colorant to color the body internally and thereby produce an internally artificially colored body of the material, the material being in the form of a hard, coherent body at least one-eighth inch in thickness in at least one dimension and containing natural water at the time of contacting with the solution and being untreated by a process for the removal of natural water tenaciously held therein whereby the material is rendered useful as a colored building material.

2. The process of claim 1 wherein the colorant is dissolved in a substantially nonpolar solvent.

3. The artificially colored material prepared by the process of claim 1.

4. The process of claim 1 wherein the solution contains an anthraquinone dyestuff.

5. The process of claim 1 wherein the solution contains a triphenylmethane dyestuff.

6. The process of claim 1 wherein the solution contains a diphenylmethane dyestuff.

7. The process of claim 1 wherein the solution contains a quinoline dyestuff.

8. The process of claim 1 wherein the body of material is contacted with a solution consisting essentially of an organic, water-insoluble, oil soluble colorant having the formula

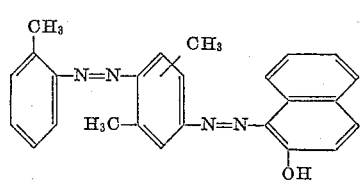

dissolved in a solvent derived from petroleum boiling in the kerosene range.

9. The process of claim 1 wherein the body of material is contacted with a solution containing a dissolved ultraviolet light stabilizer.

10. The artificially colored inorganic material prepared by the process of claim 9.

11. A process for artificially coloring in their interior particles of a colorable naturally occurring material selected from the group consisting of whitestone, calcitic limestone, dolomitic limestone, dolomite, marble, granite, and aquatic animal shells which consists essentially of the step of intimately contacting said particles of material with a solution consisting essentially of an organic, water insoluble, oil soluble colorant selected from the group consisting of azo dyestuffs, anthraquinone dyestuffs, triphenylmethane dyestuffs, acridine dyestuffs, quinoline dyestuffs, diphenylmethane dyestuffs and azoxy dyestuffs dissolved in a normally liquid organic solvent consisting essentially of at least one solvent, selected from the group consisting of normally liquid hydrocarbons, normally liquid chlorinated hydrocarbons, nitrobenzene, ethyl acetate, acetone, aniline and dimethylformamide, an excess of the solution of colorant over the quantity required to coat the surface area being intimately contacted with the particles of material over at least 15 minutes and for a period of time sufficient for the colorant to color the particles internally and thereby product internally artificially colored particles of the material, the material being in the form of hard, coherent particles having a size of about one-eighth inch to one inch and containing natural water at the time of contacting with the solution and being untreated by a process for the removal of natural water tenaciously held therein whereby the particles of material are rendered useful as a colored building material.

12. The artificially colored particles of material prepared by the process of claim 11.

13. Terrazzo containing the artificially colored particles of the material of claim 11.

14. A stone chip roof containing the artificially colored particles of material of claim 11.

15. The process of claim 11 wherein the particles of the material are contacted with a solution containing a dissolved ultra-violet light stabilizer.

16. Terrazzo containing the artificially colored particles of the material of claim 15, the terrazzo having a sealer coating applied thereto which contains an ultra violet light stabilizer to further improve the colorfastness of the colored particles.

17. A stone chip roof containing the artificially colored particles of the material of claim 15.

18. The process of claim 11 wherein the particles of the material are contacted with a solution consisting essentially of an organic, water insoluble, oil soluble colorant having the formula

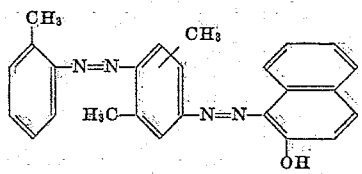

dissolved in a solvent derived from petroleum boiling in the kerosene range.

19. A process for artificially coloring in their interior particles of a colorable naturally occurring material selected from the group consisting of whitestone, calcitic limestone, dolomitic limestone, dolomite, marble, granite, and aquatic animal shells which consists essentially of the steps of intimately contacting said particles of material with a solution consisting essentially of an organic, water insoluble, oil soluble colorant selected from the group consisting of azo dyestuffs, anthraquinone dyestuffs, triphenylmethane dyestuffs, acridine dyestuffs, quinoline dyestuffs, diphenylmethane dyestuffs and azoxy dyestuffs dissolved in a normally liquid organic solvent consisting essentially of at least one solvent, selected from the group consisting of normally liquid hydrocarbons, normally liquid chlorinated hydrocarbons, nitrobenzene, ethyl acetate, acetone, aniline and dimethylformamide, an excess of the solution of colorant over the quantity required to coat the surface area being intimately contacted with the particles of material over at least 15 minutes and for a period of time sufficient for the colorant to color the particles internally and thereby produce internally artificially colored particles of the material, the material being in the form of hard, coherent particles having a size of about one-eighth inch to one inch and containing natural water at the time of contacting with the solution and being untreated by a process for the removal of natural water tenaciously held therein, removing solvent from the artificially colored particles of material, and removing excess colorant from at least the surface of the artificially colored particles of material whereby the particles of material are rendered useful as a colored building material.

20. The process of claim 19 wherein the solution of colorant also contains an ultra violet light stabilizer to improve the colorfastness of the colored particles.

21. The process of claim 19 wherein excess colorant is removed from the particles by sonic cleaning.

22. The process of claim 19 wherein the particles of the material are contacted with a solution consisting essentially of an organic, water insoluble, oil soluble colorant having the formula

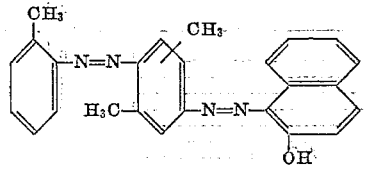

dissolved in a solvent derived from petroleum boiling in the kerosene range, and at least a portion of the solvent is removed by flooding the particles with water to produce a solvent layer and an aqueous layer, separating the solvent layer from the aqueous layer to recover the solvent and its contained colorant content, washing the particles with water containing a surface active agent to remove a further portion of the solvent, and then rinsing the particles with fresh water to remove the surface active agent.

23. The process of claim 19 wherein colorant is removed from at least the surface of the colored particles by agitation during a washing step.

24. The process of claim 19 wherein the particles of material contain a salt of carbonic acid and the colored particles are contacted with an aqueous solution of an acid having an ionization constant greater than carbonic acid to remove colorant from at least the surface of the colored particles.

References Cited in the file of this patent
UNITED STATES PATENTS

| | | |
|---|---|---|
| 700,890 | Roach et al. | May 13, 1902 |
| 1,293,832 | McDonough | Feb. 11, 1919 |
| 2,317,965 | Bestian | Apr. 27, 1943 |
| 2,616,820 | Borgeaux | Nov. 4, 1952 |
| 2,965,578 | Pestemer | Dec. 20, 1960 |

FOREIGN PATENTS

| | | |
|---|---|---|
| 587,214 | Great Britain | Apr. 17, 1947 |

OTHER REFERENCES

Chemical Abstracts, vol. 43, p. 8791, 1949.
Chemical Abstracts, vol. 44, p. 9772, 1950.
Soxhlet: "Art of Dyeing and Staining Marble, Artificial Stone, Bone and Wood," pages 62–92; pub. 1902 by Scott Greenwood & Co., London, England.